United States Patent
Maekawa (10) Patent No.: US 9,025,513 B2
(45) Date of Patent: May 5, 2015

(54) COMMUNICATION APPARATUS

(75) Inventor: Itaru Maekawa, Nagano (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1776 days.

(21) Appl. No.: 11/772,348

(22) Filed: Jul. 2, 2007

(65) Prior Publication Data

US 2008/0123582 A1    May 29, 2008

(30) Foreign Application Priority Data

Jul. 3, 2006   (JP) ................................. 2006-183835

(51) Int. Cl.
   *H04J 3/08*    (2006.01)
   *H04W 88/10*    (2009.01)
   *A63F 13/20*    (2014.01)
   *A63F 13/30*    (2014.01)
   *H04W 72/00*    (2009.01)
   *H04W 52/02*    (2009.01)

(52) U.S. Cl.
   CPC .............. *H04W 88/10* (2013.01); *A63F 13/06* (2013.01); *A63F 13/12* (2013.01); *A63F 2300/1031* (2013.01); *A63F 2300/405* (2013.01); *A63F 2300/534* (2013.01); *H04W 72/00* (2013.01); *H04W 52/0232* (2013.01); *H04W 52/0258* (2013.01)

(58) Field of Classification Search
   USPC .......................................................... 370/315
   See application file for complete search history.

(56) References Cited

U.S. PATENT DOCUMENTS

| | | | |
|---|---|---|---|
| 6,510,212 B2 * | 1/2003 | Ito et al. ................... | 379/102.03 |
| 7,155,213 B1 * | 12/2006 | Almeda et al. ............... | 455/419 |
| 7,194,263 B2 * | 3/2007 | Bahl et al. .................. | 455/432.1 |
| 7,359,674 B2 * | 4/2008 | Markki et al. ............... | 455/41.2 |
| 7,633,919 B2 * | 12/2009 | Meier ........................... | 370/338 |
| 2004/0032853 A1 * | 2/2004 | D'Amico et al. ............. | 370/349 |
| 2004/0171378 A1 * | 9/2004 | Rautila ......................... | 455/419 |
| 2005/0002350 A1 * | 1/2005 | Ono .............................. | 370/328 |
| 2009/0031035 A1 * | 1/2009 | Dharmaraju et al. ......... | 709/230 |

FOREIGN PATENT DOCUMENTS

| | | |
|---|---|---|
| JP | 2003-244105 | 8/2003 |
| JP | 2005-286626 | 10/2005 |
| WO | 2005/039228 | 4/2005 |

OTHER PUBLICATIONS

Notification of Reason(s) for Refusal dated Jun. 14, 2011, from corresponding Japanese Application No. 2006-183835.

* cited by examiner

*Primary Examiner* — Temica M Beamer
(74) *Attorney, Agent, or Firm* — Katten Muchin Rosenman LLP (57) ABSTRACT

In the game device, a period coefficient acquirer 102 extracts a first period coefficient as a factor for determining a communication period from game data. A communication manager 108 manages the status of connection with at least one communication terminal and a period coefficient deriving unit 106 derives a second period coefficient as a factor for determining a communication period from the status of connection. A period determiner 104 determines a communication period for communication with a game controller based on the first period coefficient and the second period coefficient. A correspondence table holder 120 retains a correspondence table of the status of connection and the second period coefficient, and a period coefficient deriving unit 106 refers to the correspondence table and derives the second period coefficient.

12 Claims, 5 Drawing Sheets

| FIRST PERIOD COEFFICIENT | GAME GENRE |
|---|---|
| 1 | BEAT-EM-UP GAME |
| 2 | RACING GAME |
| 3 | RPG |
| 4 | MAH-JONG, QUIZ |

FIG.6

| TERMINAL TYPE | COMMUNICATION MODE WITH OTHER COMMUNICATION RELAY APPARATUS | | | | |
|---|---|---|---|---|---|
| | WIRED COMMUNICATION OR NO COMMUNICATION | | WIRELESS COMMUNICATION | | |
| | NUMBER OF TERMINALS BEING CONNECTED | SECOND PERIOD COEFFICIENT | NUMBER OF TERMINALS BEING CONNECTED | SECOND PERIOD COEFFICIENT | |
| WIRELESS CONTROLLER 25 + HANDHELD GAME DEVICE 30 | 1~2 | 1 | 1~7 | 2 | |
| | 3~22 | 2 | 8~22 | 3 | |
| HEADSET 34 + HANDHELD GAME DEVICE 30 | UP TO TWO HEADSETS + 1~16 | 2 | UP TO TWO HEADSETS + 1~16 | 3 | |

COMMUNICATION APPARATUS

BACKGROUND OF THE INVENTION

1. Field of the Invention

The present invention relates to a communication technology and, more particularly, to a technology for determining a communication period.

2. Description of the Related Art

Various wireless communication protocols have been proposed and practiced recently. Examples of these protocols include wideband wireless local area network (WLAN) standardized in IEEE802.11 and wireless communication technology (Bluetooth™) standardized in IEEE802.15.1 for mobile information devices. These protocols are built in various information terminals for wireless communication with peripheral devices such as personal digital assistants, printers and headsets. Technological innovation in recent years has made it possible to fabricate a wireless communication module with smaller size and reduced cost. It has also become possible to build modules for plural kinds of wireless communication protocols in a single housing.

Since a handheld information communication device is driven by a battery, it is preferable to reduce power consumption necessary for communication as much as possible. A variety of methods for saving battery power are possible. For example, prolonging a communication period and reducing frequency of communication is also effective. That is an idea for reducing power consumption necessary for communication by reducing the number of transmissions and receptions of data in a predefined period of time. In a game system which is provided with a wireless handheld game controller, it is possible to extend battery time for a game controller by reducing the frequency of communication. Not only for a game system but also for other systems which execute other applications, the same situation exists. Thus, by prolonging a communication period and reducing the frequency of communication, it is possible to extend battery time of a battery for a wireless communication terminal. As described above, a communication period is an important factor in extending battery time.

SUMMARY OF THE INVENTION

A purpose of the preferred embodiment is to provide a technology for defining an optimal communication period in a wireless communication system.

To overcome the above described problems, a communication apparatus according to an embodiment of the present invention has a function for communicating with at least one communication relay apparatus and also has a function for establishing a network with and transmitting data to or receiving data from at least one communication terminal. The communication apparatus comprises: a communication type holder which retains a communication type indicating whether wired communication or wireless communication is used when communicating with at least one communication relay apparatus; and a period determiner which determines a communication period for communication between the communication apparatus and the communication terminal. The period determiner determines the communication period depending on the communication type retained in the communication type holder. The communication period may be set optimally depending on the operation status of a system or the type of an application to be executed.

Another embodiment according to the present invention is a communication apparatus for establishing a network and transmitting data to or receiving data from at least one communication terminal. The apparatus comprises: a communication manager which manages the status of connection with the communication terminal connected to the network; and a period determiner which determines a communication period for communication between the communication apparatus and the communication terminal. The period determiner determines the communication period depending on a terminal type detected by the communication manager.

Another embodiment according to the present invention is a communication apparatus for establishing a network with and transmitting or receiving control data on the progression of an application with at least one communication terminal. The apparatus comprises an acquirer which acquires a first period coefficient as a factor for determining a communication period for communication with the communication terminal from data included in application data; a communication manager which manages the status of connection with the communication terminal; a deriving unit which derives a second period coefficient as a factor for determining a communication period for communication with the communication terminal by using the status of connection managed by the communication manager; and a period determiner which determines a communication period for communication with the communication terminal based on the first period coefficient and the second period coefficient.

In the above embodiments according to the present invention, the communication apparatus may be a game device for establishing a network with a wireless game controller to transmit or receive control data on the progression of a game application. The period determiner may determine the communication period for communication between the game device and the wireless game controller.

Optional combinations of the aforementioned constituting elements, and implementations of the invention in the form of methods, apparatuses, systems, recording mediums and computer programs may also be practiced as additional modes of the present invention.

DETAILED DESCRIPTION OF THE INVENTION

The invention will now be described by reference to the preferred embodiments. This does not intend to limit the scope of the present invention, but to exemplify the invention.

Figure 1:
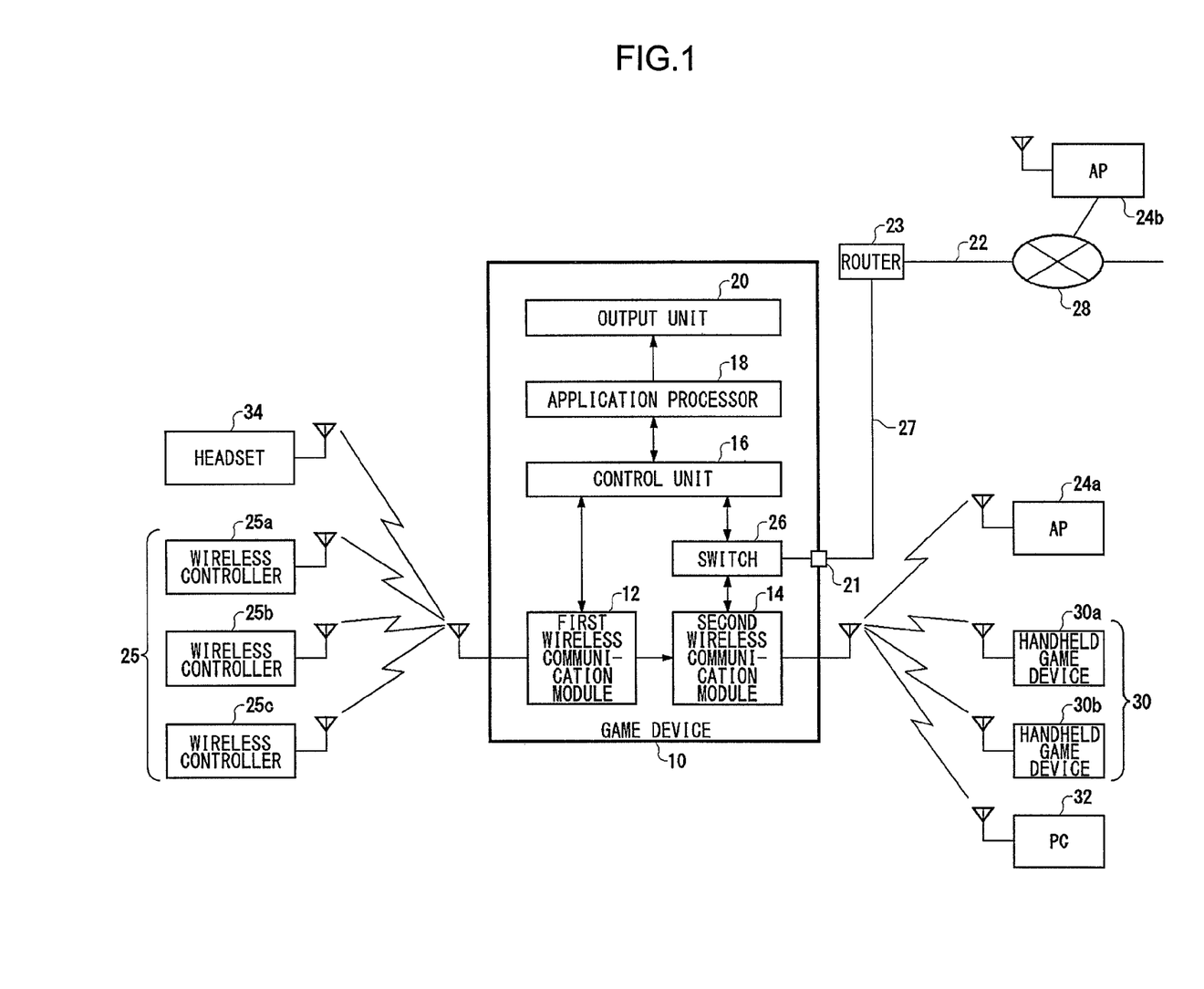
FIG. 1 shows an example of the structure of a communication system according to an exemplary embodiment of the present invention.

FIG. 1 shows an example of the structure of a communication system 1 according to the present exemplary embodiment. The communication system 1 is configured with a game device 10 as the center of the system. The game device 10 is provided with a function of wireless communication and a function of wired communication. The game device 10 is provided with a first wireless communication module 12 and a second wireless communication module 14 which execute wireless communication, a switch 26 for connecting to another network 28 through wired communication, a control unit 16 for managing the game device as a whole, an application processor 18 for running a game application and an output unit 20 for outputting a result of running the game application in a single housing A port 21 which connects electrically to the switch 26 is connected to a router 23 through a cable 27. A line 22 which is connected to the network 28 is connected to the router 23.

The game device 10 has a function for wirelessly connecting with wireless controllers 25*a*, 25*b* and 25*c* (hereinafter, referred to as wireless controllers 25), handheld game devices 30*a* and 30*b* (hereinafter, referred to as handheld game devices 30), a personal computer 32 (hereinafter, referred to as a PC 32), a headset 34 and an access point 24*a* (hereinafter, referred to as an AP 24*a*) and a function for connecting via a wire through the router 23 with an access point 24*b* (hereinafter, referred to as an AP 24*b*) which is connected to the network 28. The AP 24*b* may be connected to the network 28 through a router. The game device 10 does not have to be necessarily connected to all these communication devices. For example, when the game device 10 is connected to a certain kind of information device, a connection to other kinds of communication devices may be restricted. The game device 10 according to the present exemplary embodiment determines a communication period for communication with a communication terminal based on the connection status with a communication relay apparatus, the type or the number of communication terminals being connected and the type of application to be executed. A condition for determining a communication period may be used separately or may be used in combination.

Being provided with the first wireless communication module 12 and the second wireless communication module 14, the game device 10 functions as a wireless communication device. The first wireless communication module 12 and the second wireless communication module 14 are enabled to communicate using different wireless communication protocols or wireless communication schemes, while using the same frequency band. In the present exemplary embodiment, the first wireless communication module 12 wirelessly communicates using the Bluetooth protocol and the second wireless communication module 14 wirelessly communicates using the IEEE802.11 protocol.

In the communication system 1, the wireless controllers 25 are, for example, game controllers exclusively for controlling a game device, and wirelessly communicate using the Bluetooth protocol. One or more users let a game application proceed by manipulating the wireless controllers 25 as the users watch a game screen displayed on the display of the game device 10. By adopting a wireless controller 25, a user can enjoy a game in a free posture.

The first wireless communication module 12 is enabled to wirelessly connect to a plurality of wireless controllers 25. In Bluetooth, the frequency-hopping spread spectrum scheme is employed. In the communication system 1, the first wireless communication module 12 functions as a parent device (i.e., a master) for the wireless controllers 25. The wireless controllers 25 function as child devices (i.e., slaves). A piconet is formed between the first wireless communication module 12 and the wireless controllers 25. A piconet is a network temporarily formed by Bluetooth terminals as they are brought close to each other. A maximum of 8 Bluetooth terminals can participate in a piconet. Therefore, the first wireless communication module 12, a master, is capable of communicating wirelessly with a maximum of 7 wireless controllers 25.

A headset 34 is a headphone combined with a microphone. The headset 34 is used for a particular game application and performs wireless communication using the Bluetooth protocol. The first wireless communication module 12 forms a piconet with the headset 34. A link called eSCO (extended Synchronous Connection-oriented link) is established between the headset 34 and the first wireless communication module 12. The eSCO is a synchronous physical link for voice transmission and improves the quality of communication of voice or data by detecting an error and retransmitting.

The simultaneous use of the Bluetooth terminals, i.e., the wireless controller 25 and the headset 34 may be restricted in the communication system 1. That is, the headset 34 is not allowed to be used while the wireless controller 25 is used, and the wireless controller 25 is not allowed to be used while the headset 34 is used. Since the headset 34 mainly performs transmission and reception of voice signals, the system is easily controlled by restricting the simultaneous use of the wireless controller 25 and the headset 34. The system is also possible to be controlled so as to implement the simultaneous use of these terminals.

The handheld game device 30 is a terminal that allows a plurality of players to play a game at the same time by communicating with other handheld game devices 30 via the game device 10 as a relay station and performs wireless communication using the IEEE802.11 protocol. The handheld game device 30 may receive still image data or moving image data from the game device 10 so as to deliver an image to a user. The handheld game device 30 may also be used as a game controller for controlling the game device 10. A user may play a game application by manipulating the handheld game device 30 as he or she watches a game screen displayed on the display of the game device 10. Thus, by performing wireless communication using the IEEE802.11 protocol, the game device 10 can function so as to facilitate a plurality of uses in the communication system 1. Naturally, the handheld game device 30 can executes a game application stand alone without communicating with the game device 10.

The PC 32 has a function for performing wireless communication with the game device 10 using the IEEE802.11 protocol with a wireless communication card inserted. The game device 10 is able to be connected via a wire to the network 28 (e.g., an internet) from the switch 26 through the router 23. Thus, by using the game device 10 as a relay station, the PC 32 can transmit and receive an email to and from other PCs which are connected to the network 28 and can also brows a webpage.

The second wireless communication module 14 is capable of communicating wirelessly with a plurality of handheld game devices 30 and PCs 32. For example, IEEE802.11b protocol and/or IEEE802.11g protocol may be employed as the IEEE802.11 protocol. In a communication environment using the IEEE802.11 protocol, the second wireless communication module 14 functions as an access point and forms an infrastructure network with the handheld game device 30 and the PC 32. The MAC layer technology of IEEE802.11 for wireless LAN employs Carrier Sense Multiple Access with Collision Avoidance (CSMA/CA) as an access control scheme. An IEEE802.11 terminal is provided with a function of ensuring that a communication channel is idle for a predetermined duration of time before transmitting data. The wait time is a sum of a minimum time and a random time assigned to each terminal. This is to prevent collision of signals from a plurality of terminals transmitted simultaneously after an elapse of a certain time since the module communicated previously.

As described above, the game device 10 functions as a master among the wireless controller 25 or the headset 34, forms a piconet using the Bluetooth protocol, functions as an access point for the handheld game device 30 and forms an infrastructure network using IEEE802.11 protocol.

Meanwhile, the game device 10 is also provided with a function for operating as a relay station and relaying data between communication relay apparatuses. For example, the second wireless communication module 14 may establish a wireless channel with the AP 24a, a communication relay apparatus. Assuming that the AP 24a is the same apparatus with the game device 10, by allowing another handheld game device 30 than handheld game device 30a and 30b to communicate with the AP 24a and by establishing wireless connection between the AP 24a and the game device 10, connection between the handheld game devices 30 which are connected to different access points is established. This enables spatially-separate users to enjoy a game together.

The switch 26 further may be connected through the router 23 as a communication relay apparatus to the AP 24b connected to the network 28. Assuming that the AP 24b is the same apparatus with the game device 10, by allowing another handheld game device 30 than the handheld game devices 30a and the 30b to communicate with the AP 24b and by establishing wired connection between the AP 24b and the game device 10 through the network 28 and the router 23, connection between the handheld game devices 30 which are connected to different access points is established. As described above, the PC 32 may be connected to the second wireless communication module 14 through WLAN and may be connected to at least one other PC which is connected to the network 28.

The control unit 16 controls the performance in communication at the first wireless communication module 12 and the second wireless communication module 14. The first wireless communication module 12 is connected to the control unit 16 directly and the second wireless communication module 14 is connected to the control unit 16 through the switch 26. The switch 26 is a Eathernet™ switch. The second wireless communication module 14 as well as the first wireless communication module 12 can be connected to the control unit 16 directly. In the communication system 1 according to the present exemplary embodiment, to avoid the interference between radio waves for the first wireless communication module 12 and for the second wireless communication module 14, a single communication period is set in common for both modules and a periodic communication mode is executed wherein the communication time spans for the Bluetooth communication and for the WLAN communication are not overlapped with each other.

The periodic communication mode is adopted when the first wireless communication module 12 and the second wireless communication module 14 are simultaneously in operation. Although the wireless controller 25 or the headset 34 and the handheld game device 30 or the PC 32 can be used simultaneously, it is assumed generally that the wireless controller 25 and the handheld game device 30 are used simultaneously. In case of allowing a new user to join the game in the middle of the game progression, this periodic communication mode may be adopted. In the periodic communication mode, by separating communication windows for Bluetooth communication and WLAN communication distinctly on time axis, the interference between both communications is avoided. Further, by setting respective communication window separately, the time for communication between the second wireless communication module 14 and the PC 32 is secured and also the time for searching for a terminal (game controller) of a user who is willing to join the game is secured.

During the execution of the game application, control data for the progression of the game application is transmitted and received to and from the game device 10, the wireless controller 25, the headset 34 and/or the handheld game device 30. For example, control data transmitted from the wireless controller 25 to the game device 10 may be input information through user's manipulation of keys on the wireless controller 25 and control data transmitted from the headset 34 to the game device 10 may be voice information which is input from the microphone of the headset 34 by a user. Control data transmitted from the game device 10 to the wireless controller 25 may be a control signal which makes the wireless controller 25 vibrate to make the game more true-to-life and control data transmitted from the game device 10 to the headset 34 may be output voice information of the game application. In case the handheld game device 30 is used as a wireless game controller, the same kind of information with that transmitted between the wireless controller 25 and the game device 10 is transmitted and received between the handheld game device 30 and the game device 10. In case the game device 10 is used as an access point, status information of the game application is transmitted and received as control data between the handheld game device 30 and the game device 10. The term "status information" means information indicating the progression status of the game in the handheld game device 30.

Since control data on the progression of the game application is transmitted and received to and from the game device 10, the wireless controller 25, the headset 34 and/or the handheld game device 30, real-timeliness in information transmission is basically, if not uniformly in all the game applications, required. When higher real-timeliness is required, it is preferable to shorten the communication period. On the other hand, shortening the communication period in the situation wherein the requirement for real-timeliness is not high is not desirable because it shortens the battery time of the mobile terminal device.

In the present exemplary embodiment, in case the game device 10 transmits and receives control data on the progression of the game application to and from at least one communication relay apparatus, the communication period between the game device 10 and a communication terminal (e.g., the wireless controller 25 or the handheld game device 30) is determined depending on the connection mode for connection with the communication relay apparatus. For example, when the data transmission rate defined between the game device 10 and the communication relay apparatus is not high, the data transmission between them takes time so that it is useless to increase the frequency of communication between the game device 10 and the communication terminal. Therefore, it is preferable to set the communication period between the game device 10 and the communication terminal based on whether the game device 10 and the communication relay apparatus are connected via a wire or wirelessly connected: i.e., it is preferable to determine a communication period depending on a data transmission rate defined between the game device 10 and the communication relay apparatus. In this argument, a normal network environment is assumed wherein the data transmission rate of a wired network is higher than that of a wireless network.

The communication period between the game device 10 and the communication terminal may be determined based on the connection status between the game device 10 and the communication terminal. For example, the communication period may be determined base on the type of the communication terminal or based on the number of communication terminals which are being connected. With a certain type of communication terminal, a large quantity of data is transmitted per one session of data transmission. With that kind of communication terminal, since performing high-speed communication by shortening the communication period may be difficult, the communication period may be set longer. When there are a large number of communication terminals to be connected, there may be no allowance for shortening the communication period. In that case, the communication period may be set longer. As described above, by determining the communication period based on the connection status with the communication terminal, the communication period can be defined appropriately for a real communication environment.

When there occurs radio interference in communication between the first wireless communication module 12 and the wireless controller 25 or the headset 34 and the communication between the second wireless communication module 14 and the handheld game device 30, the interference causes a delay in data transmission. In the periodic communication mode according to the present exemplary embodiment, by setting the communication period for communication between the first wireless communication module 12 and the wireless controller 25 or the headset 34 and the communication period for communication between the second wireless communication module 14 and the handheld game device 30 periodically not overlapping on time axis, control data is communicated with stability in the communication system 1. More specifically, an identical value is set for the communication period for communication between the first wireless communication module 12 and the wireless controller 25 or the headset 34 and the communication period for communication between the second wireless communication module 14 and the handheld game device 30 and the communication window for respective module is shifted on the time axis so as not to overlap with each other. Thus, the interference between the communication by the first wireless communication module 12 and the communication by the second wireless communication module 14 is at least reduced, if not eliminated. The aforementioned function for managing communication is executed by the control unit 16.

Figure 2:
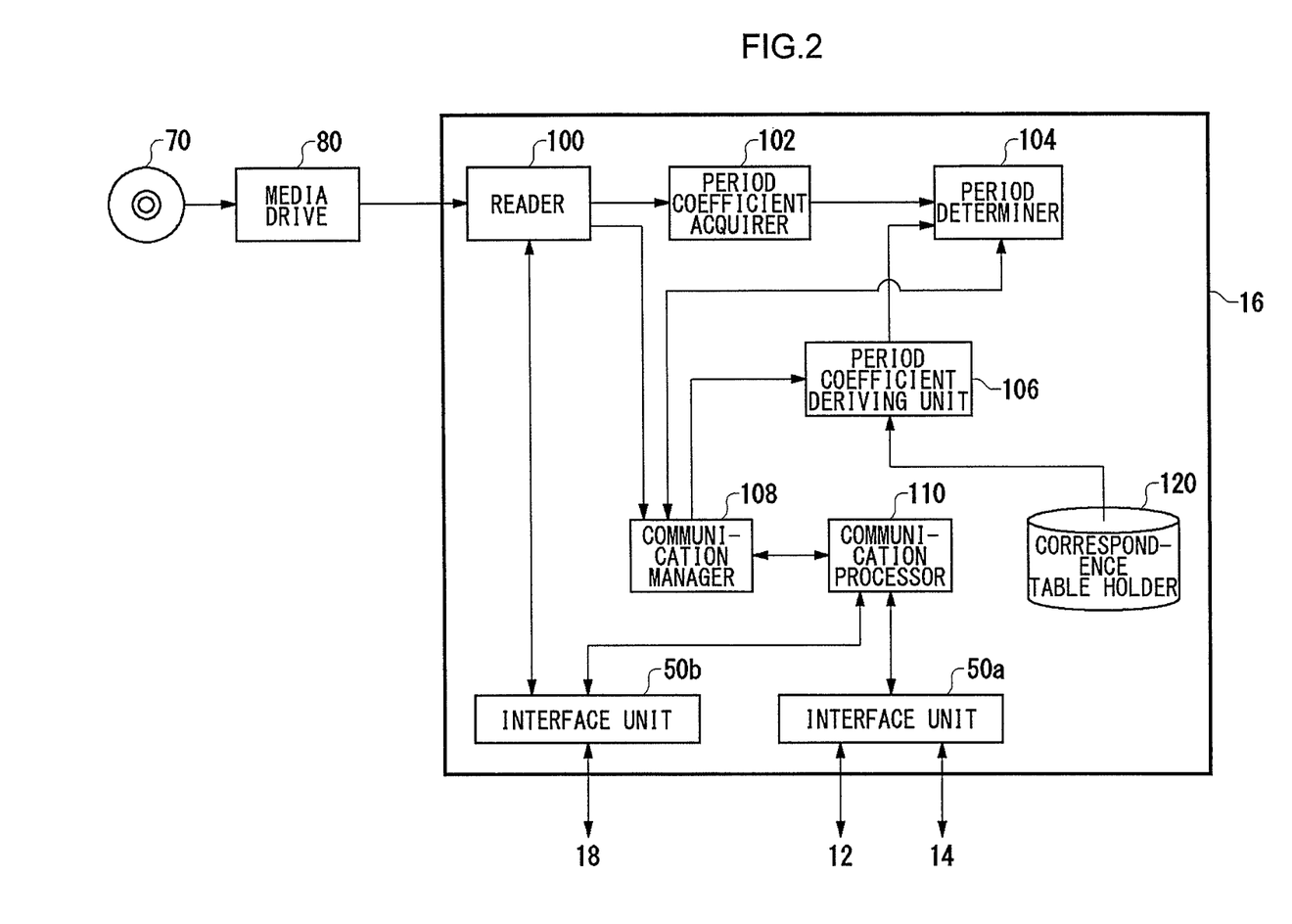
FIG. 2 shows functional blocks of a control unit.

FIG. 2 depicts functional blocks of the control unit. The control unit 16 is provided with an interface unit 50a and an interface unit 50b for data transmission and reception. The interface unit 50a interfaces with the first wireless communication module 12 and the second wireless communication module 14, and the interface unit 50b interfaces with the application processor 18. The interface unit 50a and the interface unit 50b may be configured separately or may be integrated in terms of hardware.

The control unit 16 further includes a reader 100, a period coefficient acquirer 102, a period determiner 104, a period coefficient deriving unit 106, a communication manager 108, a communication processor 110 and a correspondence table holder 120. Although the control unit 16 is provided with the function for controlling and managing the operation of game device 10 as a whole, FIG. 2 particularly depicts functional blocks for managing communication in the game device 10.

The communication management function of the control unit 16 in the game device 10 is implemented by a CPU, a memory, a program loaded into the memory and the like. FIG. 2 depicts functional blocks implemented by the cooperation of the elements. The program may be built in the game device 10 or supplied from an external source in the form of a recording medium. Therefore, it will be obvious to those skilled in the art that the functional blocks may be implemented by a variety of manners including hardware only, software only or a combination of both.

The interface unit 50a receives data received at the first wireless communication module 12 and the second wireless communication module 14. This received data is, for example, input data through user's manipulation of a game controller. The communication processor 110 transfers the data received at the interface unit 50a to the interface unit 50b and the interface unit 50b provides the application processor 18 with the data. The communication processor 110 is provided with a function for transmitting and receiving the data to and from the interface unit 50a and the interface unit 50b. As described above, the application processor 18 generates an image and a voice which reflect the input data through user's manipulation and outputs the image and the voice to the output unit 20.

The communication manager 108 manages a function for communication in the communication processor 110. The game device 10 according to the present exemplary embodiment enables wireless communication using different communication protocols and adopts a periodic communication mode to avoid the collision between data transmitted using different communication protocols. With the periodic communication mode, a single communication period are set in common for both protocols and a time span for each protocol wherein the protocol can perform communication is shifted so as not to overlap with each other. The communication period is determined by the period determiner 104 (to be described below) and the determined communication period is managed and controlled by the communication manager 108.

Figure 3:
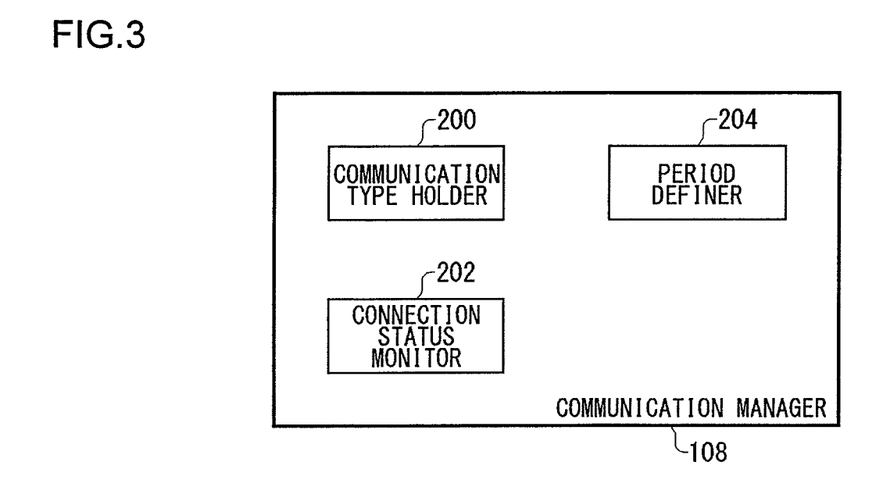
FIG. 3 shows functional blocks of a communication manager.

FIG. 3 shows function blocks of the communication manager 108. The communication manager 10B includes a communication type holder 200, a connection status monitor 202, and a period definer 204 and manages the status of connection with a communication terminal which is connected to the network configured by the game device 10.

When the game device 10 communicates with the communication relay apparatus, the communication type holder 200 retains the type of communication, i.e., whether it is wired communication or wireless communication. The game device 10, as a relay station, can be connected to either of the AP 24a, another communication relay apparatus, or the router 23 (shown in FIG. 1). When the game device 10 is connected with the AP 24a, a radio channel is used and when the device is connected with the router 23, a wired channel is used.

In case the second wireless communication module 14 and the AP 24a are wirelessly connected using IEEE802.11 protocol, the communication type holder 200 retains information indicating that the second wireless communication module 14 is wirelessly connected with the communication relay apparatus. Meanwhile, in case the switch 26 and the router 23 are connected via a wire, the communication type holder 200 retains information indicating that the second wireless communication module 14 is connected via a wire with the communication relay apparatus. In case the game device 10 is not connected with the communication relay apparatuses, i.e., the game device 10 is used stand alone, the communication type holder 200 retains information indicating that the game device 10 is not connected with communication apparatuses. As described above, based on the connection status of the second wireless communication module 14 and/or the switch 26, the communication type holder 200 retains information indicating whether the second wireless communication module 14 is connected with at least one communication apparatus or not and when the module is connected, the communication type holder 200 further retains information on a type of communication, i.e., whether it is connected via a wire or is wirelessly connected. When the communication mode for communication with the communication relay apparatus changes, the communication type holder 200 updates the retained information on the type of communication to the latest one. This information is used when determining the communication period.

The connection status monitor 202 monitors a status of connection with a communication terminal which is connected to the game device 10. As one of a variety of connection statuses which are monitored, the connection status monitor 202 monitors and acquires the type of a communication terminal being connected. The term "communication terminal" refers to a terminal which does not function as an access point, such as, the wireless controller 25, the headset 34 and the handheld game device 30. Although the PC 32 does not contribute to the execution of the game application, the PC 32 may be treated as a communication terminal in the present exemplary embodiment.

As described above, the connection status monitor 202 monitors the connection status of the first wireless communication module 12 and the second wireless communication module 14, acquires and retains the type of a communication terminal which is connected to a piconet formed by the first wireless communication module 12 and an infrastructure network formed by the second wireless communication module 14. When the connection status is changed (e.g., a communication terminal leaves the network or a new communication terminal joins the network) the connection status monitor 202 updates the retained type of communication terminal to the latest one, Information on the type of the terminal being connected is used when determining the communication period.

As a connection status, the connection status monitor 202 further monitors the number of communication terminals being connected. The connection status monitor 202 may keep track of the number of each type of the terminals being connected respectively. Information on the number of terminals being connected is used when determining the communication period. The connection status monitor 202 continuously monitors the status of connection to the communication terminal while the game device 10 is in operation.

Referring back to FIG. 2, a media drive 80 drives with a media 70 which stores game data. The media 70 is, for example, a CD-ROM, a DVD or a disc designed specifically for the game device 10 and stores game data which is necessary for the execution of a game application (e.g., AV data for a game scene or a game program). The term "game data" may be used for, for example, the entirety of data stored in a disk when launching a game by inserting the disk which contains a game program, into the drive of the game device. The game data may be stored in the media 70 in a form which is ready for execution by the application processor 18 or in a form which needs to be decoded before execution by the application processor 18. The game data stored in the media 70 is read out from the media drive 80 by the reader 100.

In the media 70, a coefficient for the communication period required by the game application is stored as an element of game data. This coefficient of the communication period (herein after referred to as a first period coefficient) is defined by, for example, a game developer and built in the game data as a data value which indicates a feature of the game application. The first period coefficient is a fixed value for the game application and does not change depending on the status of connection with communication terminals.

Game applications are roughly categorized into two groups in terms of real-timeliness, i.e., into a group of games with relatively severe requirement for real-timeliness and a group of games with less severe requirement for real-timeliness. A game with severe requirement for real-timeliness is characterized by a rapid progression of the game and a need for immediate reflection of a user input in an output, such as a display etc. Beat-em-up games or racing simulation games would be given as examples. A game with less severe requirement for real-timeliness is characterized by a comparatively slow game progression. Match-up games like Japanese chess and mah-jong as well as role playing games (RPG) would be given as examples.

When running a game application which requires severe real-timeliness, frequency of transmitting and receiving control data for progression of the game application between the game device 10 and the wireless controller 25, or the headset 34 or between the game device 10 and the handheld game device 30 is preferably, high; i.e., it is preferable to secure high real timeliness by setting the communication period shorter and satisfy the severe requirement of the game.

On the other hand, in transmitting and receiving control data for the progression of a game application which requires less severe real timeliness, the frequency of communication can be set low. In this case, even with a long communication period, the amusement of the game is not damaged and by setting the communication module in the wireless controller 25 or the handheld game device 30 to a power saving mode while the communication is not performed, it is possible to avoid wasting battery power.

Figure 4:
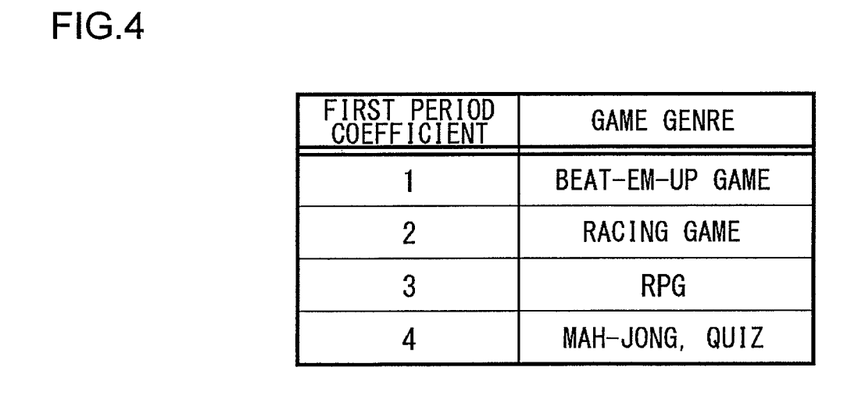
FIG. 4 is a table illustrating a correspondence between a first periodic coefficient and a game genre.

FIG. 4 shows a correspondence between the first period coefficient and a game genre. The first period coefficient is an integer from 1 to 4. A smaller value is set for a game with higher real-timeliness and a larger value is set for a game with lower real-timeliness. The correspondence table shown in FIG. 4 is a guideline in setting the first period coefficient. A game developer refers to the correspondence table and determines a first period coefficient value. Although in the correspondence table, a beat-em-up game is set as a game application which requires the highest real-timeliness and a mah-jong game is set as a game application which requires the lowest real-timeliness, the game developer does not have to stick to the table and may determine the first period coefficient freely.

On reading game data out of the media drive 80, the reader 100 provides the data for running the game application to the interface unit 50b. The game data for running the game application includes a game program, AV data or the likes. The interface unit 50b transmits the game data to the application processor 18. In the application processor 18 a scene for the progression of the game and voice to be output are generated and are output from the output unit 20. In this process, as will be described below, input information through user's manipulation transmitted from the wireless controller 25 and/or the handheld game device 30 which functions as a game controller are sent to the application processor 18 via the interface unit 50a, the communication processor 110 and the interface unit 50b. The application processor 18 processes game data necessary for the game progression and input data through user's manipulation and generates a scene in the progression of the game and voice to be output.

The reader 100 transmits a data string including the first period coefficient stored in a predefined storage area of the media 70 to the period coefficient acquirer 102. A point in time to read out the first period coefficient may be right after the media 70 is inserted into the media drive 80 and is started up. Since the first period coefficient is used as a factor in defining the communication period for communication with other communication terminals (e.g., the wireless controller 25 and/or the handheld game device 30) it is preferable that the first period coefficient be transmitted to the period coefficient acquirer 102 before the game application is started up.

The period coefficient acquirer 102 extracts and acquires the first period coefficient from the transmitted data string. Also, the reader 100 may extract the first period coefficient. In that case, the reader 100 is provided with the function of the period coefficient acquirer 102. On extracting the first period coefficient which is set for the game application, the period coefficient acquirer 102 provides the coefficient to the period determiner 104.

Further, the period coefficient acquirer 102 may retain the correspondence table shown in FIG. 4. This table is configured with the first period coefficient and a game genre associated with each other and is used in acquiring the first period coefficient by referring to a game genre. In the media drive 80, the game genre of the game application is stored. The reader 100 transmits the data string including the game genre stored in the predefined storage area in the media 70 to the period coefficient acquirer 102. A point in time to read out the data string including the game genre may be right after the media 70 is inserted into the media drive 80 and is started up. The period coefficient acquirer 102 extracts the game genre from the transmitted data string. After extracting the game genre, the period coefficient acquirer 102 refers to the correspondence table retained by itself and acquires the first period coefficient which is set for the game genre. The first period coefficient is provided to the period determiner 104.

Figure 5:
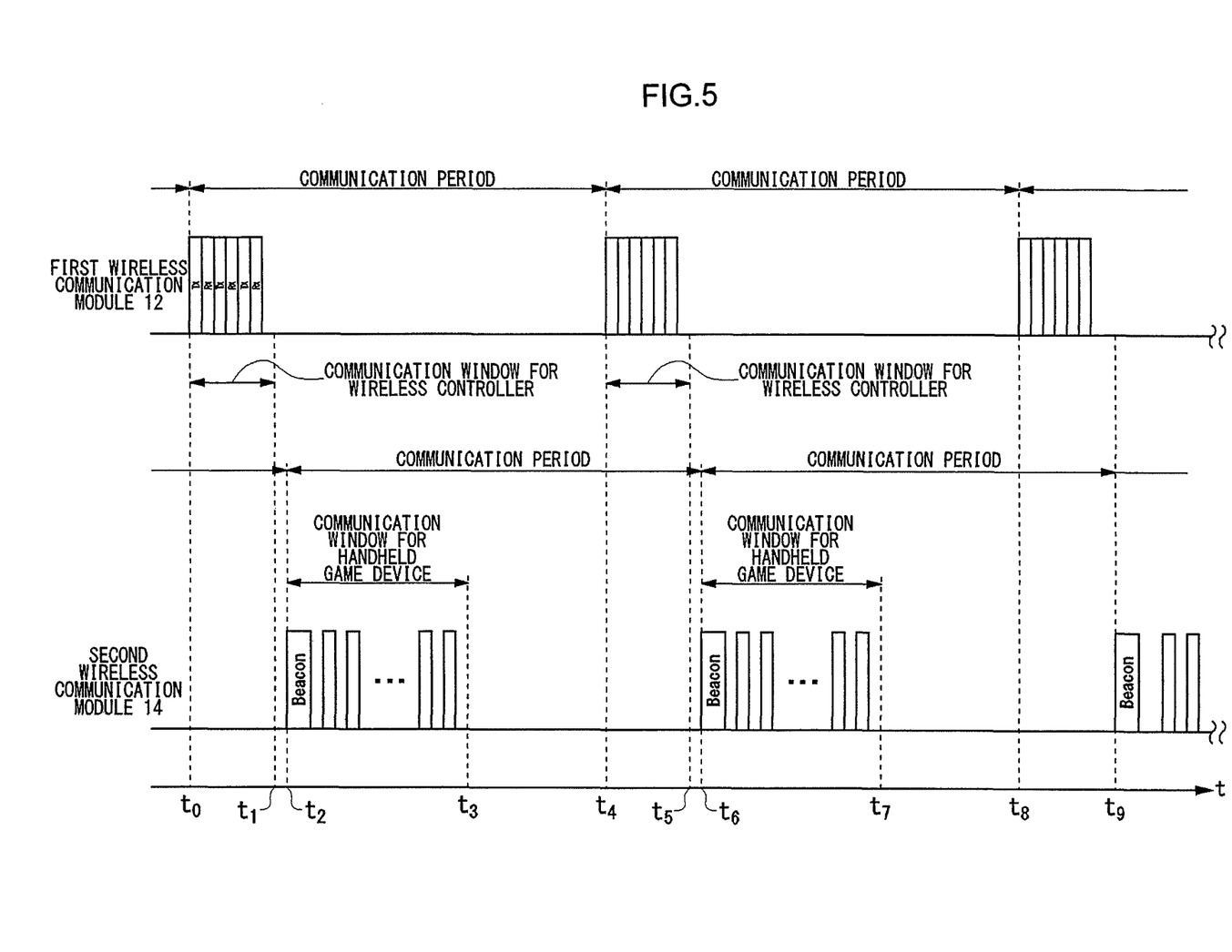
FIG. 5 shows an operation of a first wireless communication module 12 and a second wireless communication module 14 in a periodic communication mode.

FIG. 5 shows an operation of the first wireless communication module 12 and the second wireless communication module 14 in the periodic communication mode. In communication processing in the first wireless communication module 12 and the second wireless communication module 14, the period determiner 104 determines a single communication period common for both modules and the period definer 204 in the communication manager 108 sets the determined communication period in the first wireless communication module 12 and the second wireless communication module 14 via the communication processor 110. In this process, the period definer 204 determines a communication window for communication between the first wireless communication module 12 and the wireless controller 25 and a communication window for communication between the second wireless communication module 14 and the handheld game device 30 and sets the communication window in the first wireless communication module 12 and in the second wireless communication module 14. The period definer 204 further defines a point in time to start respective communication period and sets the point in time in the first wireless communication module 12 and in the second wireless communication module 14. In case the headset 34 is used instead of the wireless controller 25 as a Bluetooth terminal, the communication period and the like is defined for the headset 34.

The communication period, the respective communication window and the respective point in time to start the communication period are transferred to the wireless controller 25 and the handheld game device 30. The wireless controller 25 and the handheld game device 30 set its communication function to power saving mode except during its own communication window to reduce the power consumption of the battery. By scheduling the communication window in advance, the communication processing has to be performed only in a predefined time span, which does not only extend the battery time, but also improves the stability in communication.

In the periodic communication mode shown in FIG. 5, the communication between the first wireless communication module 12 and the wireless controller 25 starts at a time $t_0$ and the communication window is defined to last until a time $t_1$. This point in time to start the communication is set as the starting point of the communication period. In the communication window, the wireless controller 25 keeps the communication function running and after the communication window is over, i.e., after the time $t_1$, the wireless controller 25 is switched into a power saving mode. Just before the expiration of the communication period, i.e., just before a time $t_4$, the wireless controller 25 returns its communication function from the power saving mode to the operation mode. The wireless controller 25 repeats this operation. That is, from the time $t_4$, the subsequent communication period for communication between the first wireless communication module 12 and the wireless controller 25 starts. When the communication window ends at a time $t_9$, the wireless controller 25 switches its communication function into power saving mode and just before the time $t_8$, the wireless controller 25 returns the communication function to the operation mode.

Meanwhile, the communication between the second wireless communication module 14 and the handheld game device 30 starts at a time $t_2$. The time $t_2$ is a target beacon transmission time (TBTT) which is the closing time of the preceding beacon interval. Although in FIG. 5, it is depicted as if the second wireless communication module 14 transmits a beacon signal at the time $t_2$, actually, the second wireless communication module 14 transmits the beacon signal after a random waiting time called "back off" has elapsed from the time $t_2$ in conformity with the IEEE802.11 protocol. The time $t_2$ which is the target beacon transmission time is set as a starting point of the communication period for the second wireless communication module 14. During the communication window, the handheld game device 30 keeps the communication function in operation mode and after the communication window is over, i.e., after the time $t_3$, the handheld game device 30 is switched into a power saving mode. Just before the expiration of the communication period, i.e., just before the time $t_6$, the handheld game device 30 returns its communication function from the power saving mode to the operation mode. The handheld game device 30 repeats this operation. That is, from the time $t_6$, the subsequent communication period for communication between the second wireless communication module 14 and the handheld game device 30 starts. When the communication window ends at the time $t_7$, the handheld game device 30 switches its communication function into the power saving mode and just before the time $t_9$, the handheld game device 30 returns the communication function to the operation mode.

As described above, by determining a single communication period common for both modules and setting the communication window for the first wireless communication module 12 and the communication window for the second wireless communication module 14 not to coincide with each other, stable communication is achieved. More specifically, the time interval between the starting time ($t_0$ and $t_2$) of respective communication window is set longer than communication window for communication between the first wireless communication module 12 and the wireless controller 25 ($t_1$-$t_0$) and the end time $t_3$ of communication window for communication between the second wireless communication module 14 and the handheld game device 30 is set before the endpoint $t_4$ of the communication period between the first wireless communication module 12 and the wireless controller 25. Thus, while the communication function of the wireless controller 25 is in the operation mode, the communication function of the handheld game device 30 is in the power saving mode and when the communication function of the handheld game device 30 is in the operation mode, the communication function of the wireless controller 25 is in the power saving mode. By limiting the communication windows for the first wireless communication module 12 and the second wireless communication module 14 as short as possible and by setting the communication period as long as possible, the power saving efficiency is increased. In the communication system 1 according to the present exemplary embodiment, by allowing the control unit 16 to define the communication period appropriately, a time period wherein the wireless controller 25 and/or the handheld game device 30 set its communication function in power saving mode is defined optimally.

As described above, the communication manager 108 manages the status of connection between the game device 10 and the communication terminals. Other communication terminals include the wireless controller 25, the headset 34 and the handheld game device 30. As shown in FIG. 5, in the periodic communication mode, the communication window for the first wireless communication module 12 and the communication window for the second wireless communication module 14 are set on the time axis so as not coincide with each other. Nevertheless, higher power saving efficiency is achieved by setting the communication window as short as possible. Thus it is preferable that the communication manager 108 manage the number of the wireless controllers 25 or the headsets 34 which are connected to the first wireless communication module 12 and the number of the handheld game devices 30 which are connected to the second wireless communication module 14 and change the communication window dynamically depending on the number of the terminals. That is, when the number of the terminals being connected is reduced, it may be able to provide further power saving by shortening the communication window.

As described above, information such as, the first period coefficient, the game genre to acquire the first period coefficient and the likes is implanted in the game data. Further, information on the maximum number of players who play the game application and the type of controller which can be used is also stored. In the game device 10 according to the present exemplary embodiment, both the wireless controller 25 and the handheld game device 30 are used as a game controller. In addition, a controller specifically designed for the game, such as the headset 34 can also be used depending on a game genre. Besides the headset 34, for example, a controller replicating a steering wheel for a racing game or a controller in the shape of a glove for a beat-em-up game with which a user's three-dimensional motion is detectable may be used. For that purpose, information indicating whether a controller specifically designed for the game genre can be used or not is implanted in the game data and the communication manager 108 determines whether the controller can be used or not based on the information.

Further, the data frame length which is proper for the game application may be included in the game data. Based on such information, the communication manager 108 manages the communication as a whole, including the status of connection with the communication terminals. For example, the communication manager 108 keeps track of the number of respective communication terminals being connected, such as the wireless controller 25, the handheld game device 30 and/or the headset 34 specifically designed for the game genre. Information on the connection status managed by the communication manager 108 is sent to the period coefficient deriving unit 106, for example, at each predefined time interval.

The period coefficient deriving unit 106 derives a period coefficient (hereinafter referred to as a "second period coefficient") which is used as a factor in defining the communication period for communication with the communication terminals based on the status of connection with the communication terminals. The second period coefficient is an integer between 1 to 4. That is, a set of possible values of the second period coefficient (1-4) is identical to a set of possible values of the first period coefficient (1-4). By defining the domain of definition of the first period coefficient and the domain of definition of the second period coefficient identical to each other, it is possible to compare the first period coefficient and the second period coefficient directly, which enables determining process of the communication period in the period determiner 104 to be performed with ease.

When deriving the second period coefficient, firstly, the period coefficient deriving unit 106 refers to information indicating whether the game device 10 communicates with at least one communication relay apparatus or not and in the former case, whether it is wired communication or the wireless communication. This information which indicates the type of communication is retained in the communication type holder 200. Since the wired communication provides a high speed communication with stability in comparison with wireless communication, the information indicating the type of communication is an important factor in determining the communication period.

Secondly, the period coefficient deriving unit 106 refers to information indicating the type of communication terminal being connected. This information is monitored and acquired by the connection status monitor 202. Since the quantity of data to be transmitted and received is different depending on the type of communication terminal, the information indicating the type of communication terminal is an important factor in determining the communication period.

The period coefficient deriving unit 106 then refers to information indicating the number of communication terminals being connected. When the number of connected terminals increases, a period required for communication is inevitably extended. Thus the information indicating the number of communication terminals is an important factor in determining the communication period in the communication system 1 according to the present exemplary embodiment.

Figure 6:
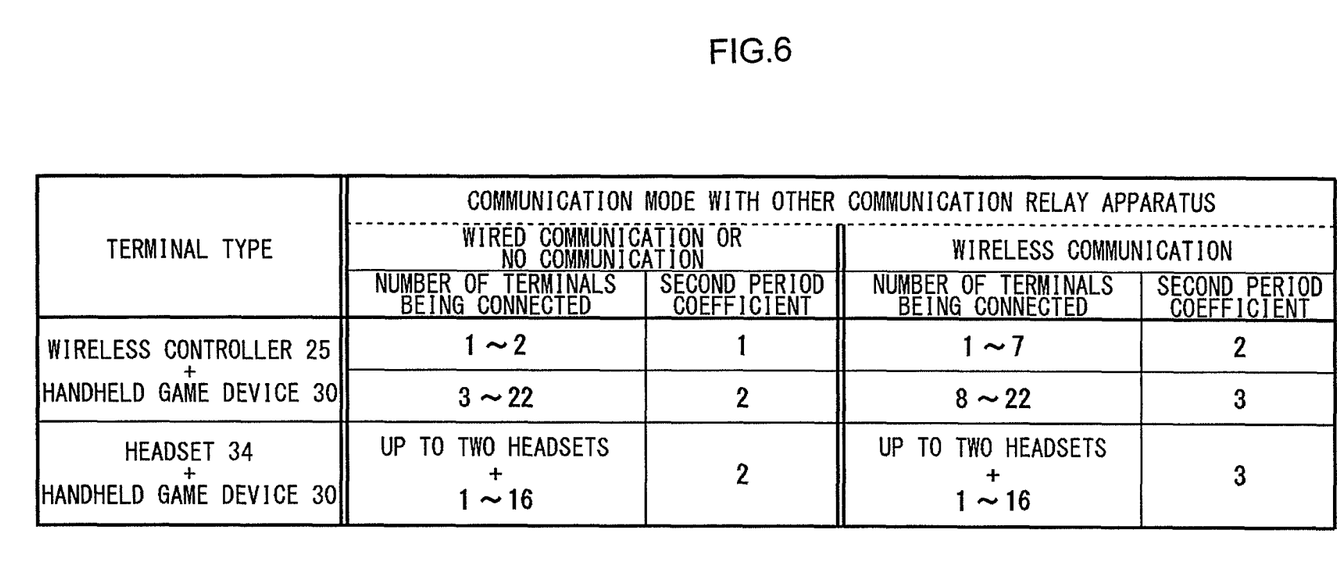
FIG. 6 shows an example of a table illustrating a correspondence between a status of connection with at least one communication terminal and a second periodic coefficient.

FIG. 6 shows an example of a table illustrating a correspondence between the status of connection with the communication terminals and a second period coefficient. In the example of FIG. 6, as factors for deriving the second period coefficient,
(1) the mode of communication with the communication relay apparatus (the communication type)
(2) the type of communication terminal being connected (the terminal type)
(3) the number of communication terminals being connected (the number of connected terminals)
are adopted. The smaller the value of the second period coefficient, the shorter the communication period can be set as will be described later in detail.
(1) The Communication Type The communication type is a factor for determining whether or not the game device 10 is in an environment where there is a point in increasing the frequency of communication with the communication terminals. In FIG. 6, the communication type is categorized by whether the game device 10 is: a) not connected to or is connected via wire to the communication relay apparatus or; b) is wirelessly connected to the apparatus. In the former case (i.e., the game device 10 is not connected to or is connected to the communication relay apparatus), the game device 10 is in an environment where high speed communication is possible, thus, there is a point in increasing the frequency of communication with the communication terminals. In the latter case (i.e., the game device 10 is wirelessly connected to the communication relay apparatus), the environment for high-speed communication is not sufficient compared to the former case. Thus, there is not much point in increasing the frequency of communication with the communication terminal. Therefore, in the former communication mode, compare to the latter communication mode, a smaller value is set as the second period coefficient so that the communication period can be defined shorter.

(2) The Terminal Type

The terminal type is a factor for determining whether or not the game device 10 is in an environment where the frequency of communication with the communication terminal can be increased. The terminal type is categorized by whether the Bluetooth terminal is the wireless controller 25 or the headset 34 here. If it is the wireless controller 25, since the quantity of data to be transmitted and received is not large, each communication can be completed in short time. Thus it is determined that the game device 10 is in the environment wherein the frequency of communication can be increased. On the other hand, in case of the headset 34, since the headset 34 transmits and receives voice data with a large data size, it takes a certain time for each communication. Thus it is determined that the game device 10 is in an environment wherein it is relatively difficult to increase the frequency of communication. Thus in case the game device 10 is connected to the headset 34, by setting the second period coefficient larger, the communication period is set longer than that of the case when the game device 10 is connected with the wireless controller 25.

(3) The Number of Connected Terminals

The number of connected terminals is a factor for determining whether or not the game device 10 is in an environment where the frequency of communication with the communication terminal can be increased. The larger the number of connected terminals, the more it is required to secure the communication window in the periodic communication mode, thus it is difficult to define the communication period short. Therefore, when the number of connected terminals is large, by setting the second period coefficient larger, the communication period is set longer than that of the case when the number of connected terminals is small. In the correspondence table shown in FIG. 6, if the Bluetooth terminal is the wireless controller 25, the number of connected terminals is calculated as the sum of the number of wireless controllers 25 and handheld game devices 30 being connected. The second period coefficient value changes depending on whether the number of connected terminals is up to two or more than two. On the other hand, if the Bluetooth terminal is the headset 34, the maximum number of headsets 34 to be connected is determined to be two and the maximum handheld game device 30 to be connected is determined to be sixteen. If the number of the connected terminals is within the respective range, the second period coefficient is defined as a single value. However, it is possible to change the second period coefficient value depending on the number of the headsets 34 or the number of the handheld game devices 30 in an similar fashion to the case of the wireless controller 25.

The correspondence table holder 120 retains the correspondence table shown in FIG. 6. The period coefficient deriving unit 106 refers to the correspondence table retained in the correspondence table holder 120 and derives the second period coefficient associated with the connection status which is transmitted from the communication manager 108. In case the game device 10 wirelessly communicates with the communication relay apparatus (e.g., AP 24a) and is connected with eight terminals including the wireless controllers 25 and the handheld game devices 30, "3" is derived as the second period coefficient. In case the game device 10 is not connected with the communication relay apparatuses and is connected with two headsets 34, "2" is derived as the second period coefficient. The period coefficient deriving unit 106 provides the period determiner 104 with the derived second period coefficient.

The correspondence table holder 120 may also retain a correspondence table wherein the second period coefficient and other connection statuses are associated with each other. In the correspondence table, the second period coefficient is associated with three factors, i.e., (1) the communication type, (2) the terminal type and (3) the number of connected terminals. However, the table may also be configured with the second period coefficient associated with one of these factors or two of those factors.

The period determiner 104 determines communication period for communication with the communication terminal based on the first period coefficient provided by the period coefficient acquirer 102 and the second period coefficient provided by the period determiner 104. The communication period is determined by the following equation for determining the period.

$$(\text{communication period}) = \text{MAX (first period coefficient, second period coefficient)} \times \text{reference period} \quad (1)$$

Here, MAX (A,B) is a larger value of the two figures. If A is the same as B, MAX (A,B) is equivalent to the value.

The period determiner 104 compares the magnitudes of the first period coefficient and the second period coefficient and, using the selected first period coefficient or second period coefficient selected as a result of comparison, determines the communication period. More specifically, as shown in the equation (1), the period determiner 104 determines the time derived from the reference period multiplied by the larger value of the first period coefficient and the second period coefficient as the communication period. Thus the communication period is set to be an integral multiple (one time or more) of the reference period.

In the present exemplary embodiment, the reference period is set to 11.25 ms, which is shorter than the frame rate (1/60 s) for motion pictures. When the first period coefficient is "1" and the second period coefficient is also "1", the communication period is determined to be 11.25 ms. Since at least one communication window is set in each 1/60 s for both Bluetooth communication and WLAN communication, the requirement for high real-timeliness is satisfied. It is recommended to allot value "1" as the first period coefficient for a certain game genre such as a beat-em-up game. The value "1" as the second period coefficient is a value dynamically derived by the period coefficient deriving unit 106 when the game device 10 does not communicate with the communication relay apparatuses or when the device communicates with the communication relay apparatus via wire and is connected to one or two terminals including the wireless controllers 25 and the handheld game devices 30.

Even when the value "1" is set as the first period coefficient, a value "2" can be derived as the second period coefficient by referring to FIG. 6. For example, in case the game device 10 does not communicate with or communicates via wire with the communication relay apparatus and is connected with more than three wireless controllers 25, a value "2" is derived as the second period coefficient by referring to FIG. 6. Therefore, according to the equation (1), the communication period is determined to be twice the reference period, i.e., 22.5 ms. In this way, with the communication period determining method according to the present exemplary embodiment, while heeding the requirement for the frequency of communication from the game application as much as possible, the frequency of communication is dynamically determined depending on the actual connection status. By using two period factors in determining the communication period, an appropriate communication period can be determined under an actual communication environment.

In case there is a change in the connection status, the communication manager 108 transmits information on the latest connection status to the period coefficient deriving unit 106. The period coefficient deriving unit 106 derives the second period coefficient based on the connection status. The period determiner 104 determines the communication period based on the derived second period coefficient. Processing for determining the communication period may also be performed at each predefined interval. In either case, the appropriate communication period can be maintained by reflecting the dynamic change of connection status in the communication period determination.

The communication period determined at the period determiner 104 is transferred to the communication manager 108. The period definer 204 in the communication manager 108 provides the first wireless communication module 12 and the second wireless communication module 14 with the determined communication period. The first wireless communication module 12 transfers the communication period to the wireless controller 25 and/or the headset 34 being connected with the module and the second wireless communication module 14 transfers the communication period to the handheld game device 30 being connected with the module. If there is a change in the number of connected terminals, the period definer 204 increases or decreases the communication window for the corresponding communication protocol. As is obvious, in the periodic communication mode, the communication window is also transferred to the wireless controller 25 and/or the handheld game device 30 so that optimally scheduled communication processing is implemented.

Although in the example described above, not only the wireless controller 25 but also the handheld game device 30 is used as a game controller, the aforementioned method for determining the communication period can also be used in case wherein the game device 10 functions as a relay station and a game is played among the handheld game devices 30. In this case, all the handheld game devices 30 function as a game device provided with the aforementioned control unit 16. That is, when focusing on one handheld game device 30, the handheld game device 30 works as the game device 10 provided with the control unit 16 and other handheld game devices 30 function as a game controller which transmits control data for the game application.

Given above is an explanation based on the exemplary embodiments. These embodiments are intended to be illustrative only and it will be obvious to those skilled in the art that various modifications to constituting elements and processes could be developed and that such modifications are also within the scope of the present invention.

Although in the correspondence table shown in FIG. 6, the second period coefficient is associated with three factors (i.e., the communication type with the communication relay apparatus, the type of communication terminals and the number of communication terminals), the second period coefficient may be associated with one or two of the factors. That is, the second period coefficient may be associated with any of the communication type, the terminal type or the number of connected terminals. The second period coefficient may also be associated with a combination of two of the factors. For example, when the quantity of data transmitted from the headset 34 is small and comparable with that of the wireless controller 25, the correspondence table may be generated without the type of communication terminal. When the data transmission rate via the wired network and the data transmission rate for wireless network are substantially comparable, the correspondence table is generated without the communication type. And when the number of communication terminal being connected is limited to, for example, several, the correspondence table may be generated without the number of connected terminals.

Although an explanation on execution of a game application is given in the exemplary embodiments, much the same is true on execution of applications other than a game application. For example, in case of acquiring data on a still image from the game device 10 using the handheld game device 30, value "4" may be set as the second period coefficient in the image acquiring application since the high-speed processing is not required. Generally, if the application is not a game application, real time processing is not required most of the time. Thus a value "4" as the second period coefficient may be set for an application other than a game application.

What is claimed is:

1. A communication relay apparatus for relaying data to and from another communication relay apparatus, the communication relay apparatus having a function for establishing a network with at least one communication terminal to transmit or receive data and the another communication relay apparatus connecting to another network, the communication relay apparatus comprising:
   a communication type holder which retains a communication type indicating whether wired communication or wireless communication is used when communicating with the another communication relay apparatus; and
   a period determiner which determines a length of a communication period in which communication between the communication relay apparatus and the communication terminal is performed; wherein
   the period determiner sets the length of the communication period to be different depending on the communication type indicating whether wired communication or wireless communication is used retained in the communication type holder.

2. The communication relay apparatus according to claim 1, wherein the period determiner determines the length of the communication period depending on the data transmission rate defined with respect to the another communication relay apparatus.

3. The communication relay apparatus according to claim 1, further comprising a communication manager which manages the status of connection with the communication terminal connected to the network, wherein
   the period determiner determines the length of the communication period depending on a terminal type detected by the communication manager.

4. The communication relay apparatus according to claim 1, wherein control data on the progression of an application is transmitted between the communication relay apparatus and the communication terminal, the communication relay apparatus further comprising:
   an acquirer which acquires a first period coefficient that is used as a factor for determining the length of the communication period for communication with the communication terminal from data included in application data;
   a communication manager which manages the status of connection with the communication terminal; and a deriving unit which derives a second period coefficient as a factor for determining the length of the communication period for communication with the communication terminal by using the status of connection managed by the communication manager, wherein the period determiner determines the length of the communication period based on the first period coefficient and the second period coefficient.

5. The communication relay apparatus according to claim 1, wherein the communication relay apparatus is a game device for establishing a network with a wireless game controller to transmit or receive control data on the progression of a game application, and the period determiner determines the length of the communication period for communication between the game device and the wireless game controller.

6. A non-transitory computer readable recording medium having embodied thereon a computer program for a communication relay apparatus for relaying data to and from another communication relay apparatus, the communication relay apparatus having a function for establishing a network with at least one communication terminal to transmit or receive data and the another communication relay apparatus connecting to another network, the program comprising:

a communication type holder module which retains a communication type indicating whether wired communication or wireless communication is used when communicating with the another communication relay apparatus; and a period determiner module which determines a length of a communication period in which communication between the communication relay apparatus and the communication terminal is performed; wherein the period determiner module sets the length of the communication period to be different depending on the communication type indicating whether wired communication or wireless communication is used retained in the communication type holder module.

7. A communication apparatus for establishing a network with at least one communication terminal to transmit or receive data, comprising:

a communication manager which manages the status of connection with the communication terminal connected to the network; and a period determiner which determines a length of a communication period in which communication between the communication apparatus and the communication terminal is performed, wherein the period determiner sets the length of the communication period to be different depending on a terminal type detected by the communication manager.

8. A communication apparatus for establishing a network with at least one communication terminal to transmit or receive control data on the progression of an application, comprising:

an acquirer which acquires a first period coefficient as a factor for determining a length of a communication period for communication with the communication terminal from data included in application data;

a communication manager which manages the status of connection with the communication terminal;

a deriving unit which derives a second period coefficient as a factor for determining the length of the communication period for communication with the communication terminal by using the status of connection managed by the communication manager; and a period determiner which determines the length of the communication period in which the communication apparatus performs communication with the communication terminal, based on the first period coefficient and the second period coefficient.

9. The communication apparatus according to claim 8, further comprising;

a correspondence table holder which retains a correspondence table of the status of connection and the second period coefficient, wherein the deriving unit derives the second period coefficient by referring to the correspondence table retained in the correspondence table holder.

10. The communication apparatus according to claim 8, wherein a set of possible values for the first period coefficient and a set of possible values for the second period coefficient are identical.

11. The communication apparatus according to claim 8, wherein the period determiner compares the magnitude of the first period coefficient and the second period coefficient and determines the length of the communication period by using the first period coefficient or the second period coefficient which is selected as a result of comparison.

12. The communication apparatus according to claim 11, wherein the period determiner, based on a reference period and the comparison result of the magnitudes of the first period coefficient and the second period coefficient, determines the length of the communication period as an integral multiple of the reference period.

* * * * *